US012261374B2

(12) United States Patent
Wang

(10) Patent No.: US 12,261,374 B2
(45) Date of Patent: Mar. 25, 2025

(54) ANTENNA STRUCTURE AND ELECTRONIC DEVICE

(71) Applicant: VIVO MOBILE COMMUNICATION CO., LTD., Dongguan (CN)

(72) Inventor: Shen Wang, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 219 days.

(21) Appl. No.: 18/118,117

(22) Filed: Mar. 6, 2023

(65) Prior Publication Data

US 2023/0208027 A1 Jun. 29, 2023

Related U.S. Application Data

(63) Continuation of application No. PCT/CN2021/115320, filed on Aug. 30, 2021.

(30) Foreign Application Priority Data

Sep. 4, 2020 (CN) ........................ 202010923239.1

(51) Int. Cl.
*H01Q 3/26* (2006.01)
*H01Q 5/35* (2015.01)

(52) U.S. Cl.
CPC ............ *H01Q 3/2694* (2013.01); *H01Q 5/35* (2015.01)

(58) Field of Classification Search
CPC .......... H01Q 3/2694; H01Q 5/35; H01Q 1/24
See application file for complete search history.

(56) References Cited

U.S. PATENT DOCUMENTS

| | | | |
|---|---|---|---|
| 2009/0224996 | A1 | 9/2009 | Kim et al. |
| 2013/0101005 | A1 | 4/2013 | Aryanfar |
| 2016/0181704 | A1 | 6/2016 | Orban et al. |
| 2016/0365624 | A1 | 12/2016 | Maley et al. |
| 2017/0062912 | A1 | 3/2017 | Shewan et al. |
| 2019/0319339 | A1 | 10/2019 | Wen et al. |

FOREIGN PATENT DOCUMENTS

| | | | |
|---|---|---|---|
| CN | 102280687 | A | 12/2011 |
| CN | 104993240 | A | 10/2015 |
| CN | 105530342 | A | 4/2016 |

(Continued)

OTHER PUBLICATIONS

International Search Report issued in corresponding International Application No. PCT/CN2021/115320, mailed Oct. 14, 2021, 4 pages.

(Continued)

*Primary Examiner* — Dieu Hien T Duong
(74) *Attorney, Agent, or Firm* — IPX PLLC

(57) ABSTRACT

An antenna structure and an electronic device, are provided. The antenna structure includes a first antenna and a second antenna, the first antenna includes a first radiator, a second radiator, a first port, and a second port, and the second antenna includes a third radiator and a third port. The first radiator, the second radiator, and the third radiator jointly constitute a ring structure, and there is a first gap between the first radiator and the second radiator, a second gap between the first radiator and the third radiator, and a third gap between the second radiator and the third radiator.

8 Claims, 12 Drawing Sheets

(56) References Cited

FOREIGN PATENT DOCUMENTS

| | | | | | |
|---|---|---|---|---|---|
| CN | 107579343 | A | | 1/2018 | |
| CN | 109586036 | A | | 4/2019 | |
| CN | 109818137 | A | | 5/2019 | |
| CN | 208939137 | U | | 6/2019 | |
| CN | 109980368 | A | | 7/2019 | |
| CN | 110061349 | A | | 7/2019 | |
| CN | 110336117 | A | * | 10/2019 | ............ G04R 60/02 |
| CN | 111463552 | A | | 7/2020 | |
| CN | 111555019 | A | | 8/2020 | |
| CN | 111987431 | A | | 11/2020 | |

OTHER PUBLICATIONS

First Office Action issued in related Chinese Application No. 202010923239.1, mailed Aug. 1, 2022, 7 pages.

International Search Report issued in corresponding International Application No. 21863577.9, mailed Jan. 31, 2024, 9 pages.

* cited by examiner

ANTENNA STRUCTURE AND ELECTRONIC DEVICE

CROSS-REFERENCE TO RELATED APPLICATIONS

This application is a continuation of International Application No. PCT/CN2021/115320, filed on Aug. 30, 2021, which claims priority to Chinese Patent Application No. 202010923239.1, filed on Sep. 4, 2020. The entire contents of each of the above-identified applications are expressly incorporated herein by reference.

TECHNICAL FIELD

This application pertains to the field of communications technologies, and specifically relates to an antenna structure and an electronic device.

BACKGROUND

With development of communications technologies, a plurality of antennas may be disposed on an electronic device, to increase a data throughput and a communication distance of the electronic device in signal transmission, for example, a Multi-Input Multi-Output (MIMO) technology. However, in a multi-antenna communications system, isolation between antennas needs to be increased, to reduce mutual interference between the antennas. This reduces a data throughput of the communications system, and further slows a transmission rate.

In the related art, to increase isolation between antennas, a spacing distance between the antennas is usually increased. In this way, a mounting space for mounting an antenna on the electronic device is increased, and a volume of the electronic device is increased.

SUMMARY

Embodiments of this application aim to provide an antenna structure and an electronic device.

According to a first aspect, an embodiment of this application provides an antenna structure, including a first antenna and a second antenna, where the first antenna includes a first radiator, a second radiator, a first port, and a second port, and the second antenna includes a third radiator and a third port;

- the first radiator, the second radiator, and the third radiator jointly constitute a ring structure, and there is a first gap between the first radiator and the second radiator, a second gap between the first radiator and the third radiator, and a third gap between the second radiator and the third radiator; and
- the first port is connected to a first end that is of the first radiator and that is near the first gap, the second port is connected to a first end that is of the second radiator and that is near the first gap, a feeding signal transmitted through the first port and a feeding signal transmitted through the second port are phase-inverted, the third port is connected to an intermediate region of the third radiator, the first radiator and the second radiator are respectively located on two opposite sides of a first symmetry axis, and the first symmetry axis intersects the intermediate region.

According to a second aspect, an embodiment of this application provides an electronic device, including the antenna structure in the first aspect.

In the embodiments of this application, radiators of a first antenna and a second antenna jointly constitute a ring structure, there is a gap between any two radiators, a third radiator is symmetrical along a first symmetry axis, and a first radiator and a second radiator are respectively located on two opposite sides of the first symmetry axis.

DETAILED DESCRIPTION

The following describes the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first," "second," and the like are intended to distinguish between similar objects but do not describe a specific order or sequence. It should be understood that, data used in such a way are interchangeable in proper circumstances, so that the embodiments of this application can be implemented in an order other than the order illustrated or described herein. Objects classified by "first," "second," and the like are usually of a same type, and the number of objects is not limited. For example, there may be one or more first objects. In addition, in the specification and the claims, "and/or" represents at least one of connected objects, and a character "/" generally represents an "or" relationship between associated objects.

An antenna structure provided in the embodiments of this application can reduce a spacing distance between two antennas, and can further increase isolation between the two antennas. This avoids mutual crosstalk of mutually irrelevant encoded signals, and reduce coupling strength between the two antennas, to avoid a defect that a transmission rate of a multi-antenna system slows because a data throughput of the multi-antenna system decreases due to relatively strong coupling between the two antennas, thereby improving overall antenna performance of the multi-antenna system.

The multi-antenna system may be a radio frequency antenna system, for example, a 2×2 Multi-Input Multi-Output (MIMO) communications system, or may be a short-range communications system such as Bluetooth, which is not specifically limited herein. In addition, the antenna structure provided in the embodiments of this application can support a high-speed dual-Bluetooth antenna communications technology that requires extremely high inter-antenna isolation.

With reference to the accompanying drawings, an antenna structure and an electronic device provided in the embodiments of this application are described in detail by using specific embodiments and application scenarios.

Figure 1:
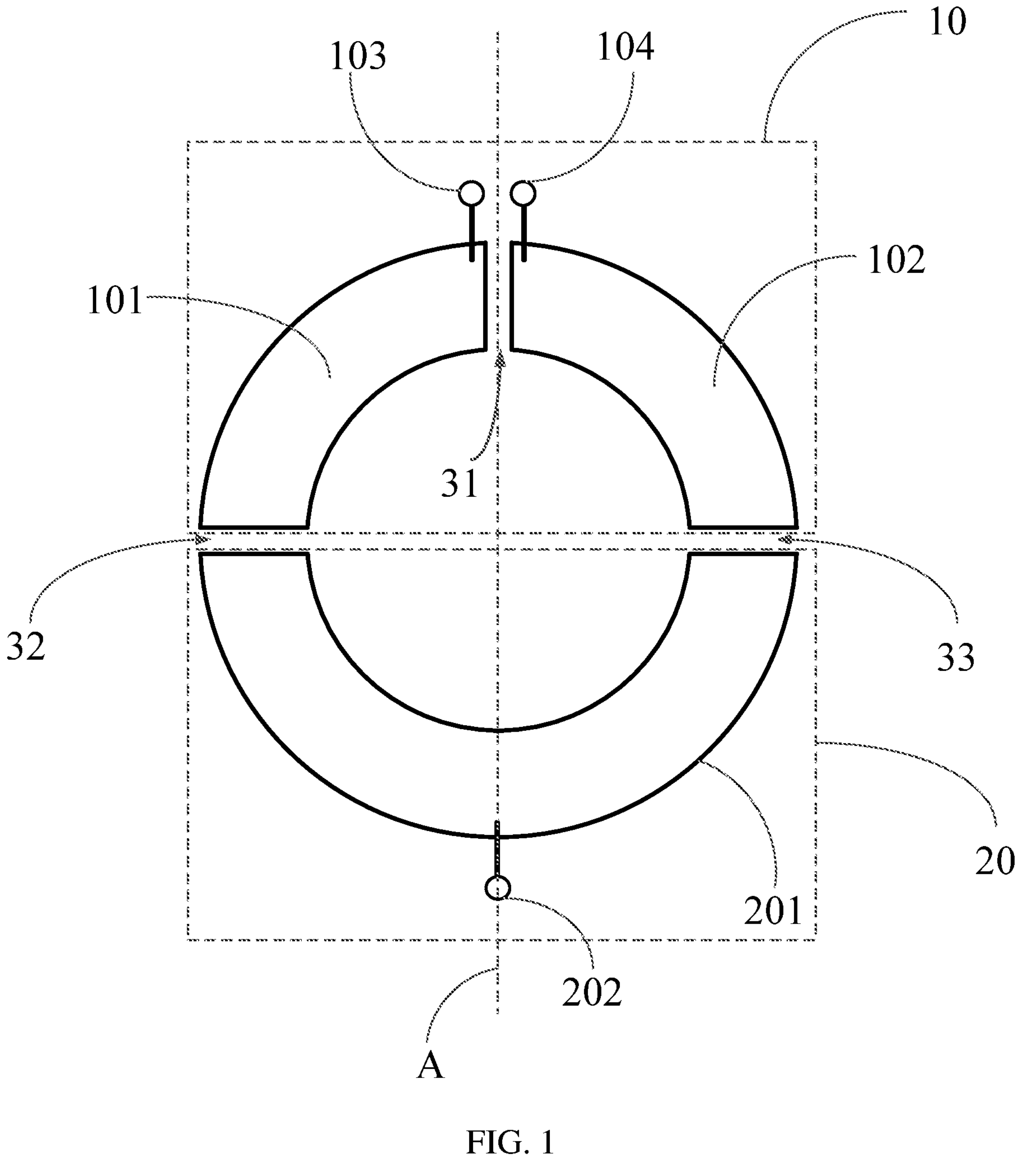
FIG. 1 is a schematic diagram of an antenna structure according to an embodiment of this application.
Figure 2:
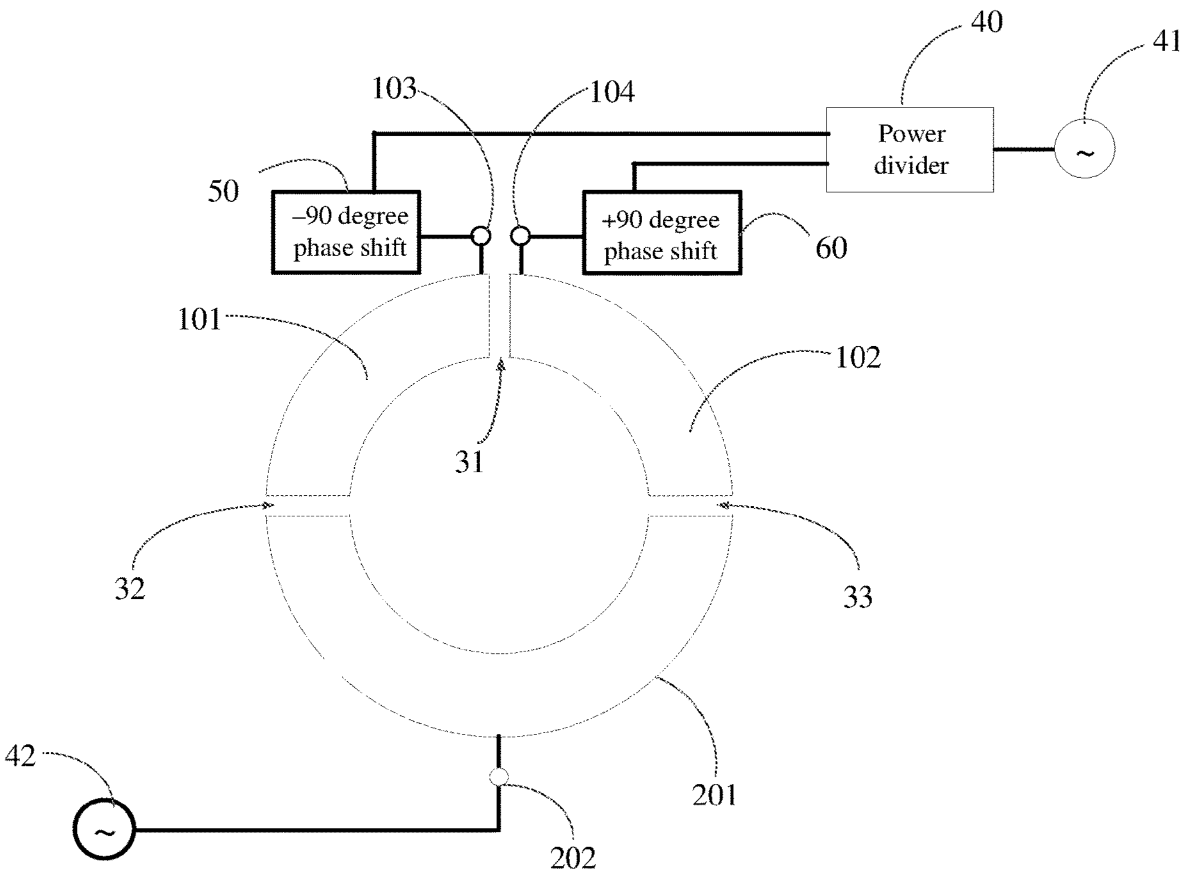
FIG. 2 is a first diagram of a feeding circuit in an antenna structure according to an embodiment of this application.

Referring to FIG. 1 and FIG. 2, FIG. 1 is a schematic diagram of an antenna structure according to an embodiment of this application, and FIG. 2 is a schematic diagram of a feeding circuit in an antenna structure according to an embodiment of this application. As shown in FIG. 1, the antenna structure includes a first antenna 10 and a second antenna 20, where the first antenna 10 includes a first radiator 101, a second radiator 102, a first port 103, and a second port 104, and the second antenna 20 includes a third radiator 201 and a third port 202.

The first radiator 101, the second radiator 102, and the third radiator 201 jointly form a ring structure, and there is a first gap 31 between the first radiator 101 and the second radiator 102, a second gap 32 between the first radiator 101 and the third radiator 201, and a third gap 33 between the second radiator 103 and the third radiator 201.

In addition, the first port 103 is connected to a first end that is of the first radiator 101 and that is near the first gap 31, the second port 104 is connected to a first end that is of the second radiator 102 and that is near the first gap 31, a feeding signal transmitted through the first port 103 and a feeding signal transmitted through the second port 104 are phase-inverted, the third port 202 is connected to a part of the third radiator 201 on a first symmetry axis A, and the first radiator 101 and the second radiator 102 are respectively located on two opposite sides of the first symmetry axis A.

In some implementations, the first port 103, the second port 104, and the third port 202 are connection components between antenna feeding lines and radiators, and may be a contact or non-contact radio frequency signal connection manner such as a spring, a conductive foam, a conductor line, or an electromagnetic coupling, which is not exhaustive herein. In addition, the first port 103, the second port 104, and the third port 202 may be connected to corresponding radiators by using a conductor, or may be directly connected to corresponding radiators by using an interface.

In addition, the first end that is of the first radiator 101 and that is near the first gap 31 may be understood as an end that is in two ends of the first radiator 101 and that is closer to the first gap 31, for example, an upper end of the first radiator 101 in the embodiment shown in FIG. 1; and the first end that is of the second radiator 102 and that is near the first gap 31 may be understood as an end that is in two ends of the second radiator 102 and that is closer to the first gap 31, for example, an upper end of the second radiator 102 in the embodiment shown in FIG. 1.

In application, the feeding signal transmitted through the first port 103 and the feeding signal transmitted through the second port 104 are phase-inverted, so that a flow direction of a feeding current transmitted through the first port 103 to the first radiator 101 is opposite to a flow direction of a feeding current transmitted through the second port 104 to the second radiator 102. For example, when the feeding current in the first radiator 101 flows from a first end of the first radiator to a second end, the feeding current in the second radiator 102 flows from a second end of the second radiator to a first end.

In addition, the ring structure may be a ring metal plate. When the foregoing antenna structure is assembled to the electronic device, the ring metal plate may be disposed in parallel with a panel of the electronic device, to reduce an occupation space of the ring structure in the electronic device.

The ring metal sheet may be a metal sheet, a Laser Direct Structuring (LDS) cable, a Flexible Printed Circuit (FPC) cable, or the like, which is not specifically limited herein.

It should be noted that, in actual application, the foregoing ring structure may be any ring structure connected in a head-to-tail manner, for example, a square structure or a diamond structure. The ring structure is not defined herein as a circular ring shown in FIG. 1 and FIG. 2.

In addition, the first gap 31, the second gap 32, and the third gap 33 are used to enable a second end of the first radiator 101 to be set open, a second end of the second radiator 102 to be set open, and both ends of the third radiator 201 to be set open, where a shape of the gap is not limited to a rectangle shown in FIG. 1, and may be a wave shape, a trapezoid, or the like.

In some implementations, the first gap 31, the second gap 32, and the third gap 33 may be filled with non-conductive materials or air.

In addition, in actual application, that the second end of the first radiator 101 is set open, so that the second end of the second radiator 102 is set open, and both ends of the third radiator 201 are set open may mean that: under a preset resonant frequency, the second end of the first radiator 101 is set open, so that the second end of the second radiator 102 is set open, and both ends of the third radiator 201 are set open. For example, the second end of the first radiator 101 is connected to a component such as a capacitor or an inductor, so that when a current of a preset resonance frequency is transmitted in the first radiator 101, the second end of the first radiator 101 is in an open state, that is, the second end of the first radiator 101, the second end of the second radiator 102, and the two ends of the third radiator 201 are respectively in an equivalent open state in terms of a resonance frequency of the antenna structure.

In operation, a current in the first radiator 101 and a current in the second radiator 102 are in a polarization orthogonal current mode. In addition, there is a first current between the third port 202 and one end of the third radiator 201, a second current between the third port 202 and the other end of the third radiator 201, and the first current and the second current are in a polarization orthogonal current mode. In this way, feeding excitation can be implemented on the two polarization orthogonal current modes in a same low-profile structure.

In this implementation, when isolation between the first antenna 10 and the second antenna 20 is met, the first antenna 10 and the second antenna 20 can be disposed in a same ring structure, thereby reducing a volume of the first antenna 10 and the second antenna 20. In addition, the ring structure may be a plate structure or a sheet structure, and may be disposed parallel to a panel or a housing of the electronic device, so that only a small space is occupied, thereby reducing a volume of the electronic device.

In some implementations, the first radiator 101 and the second radiator 102 may have a symmetric structure along the first symmetry axis A, for example, a symmetric structure shown in FIG. 1.

In some implementations, the first radiator 101 and the second radiator 102 are in an electrically symmetrical structure, which is not limited to the structure shown in FIG. 1.

In this way, polarization orthogonal performance of a characteristic current mode in the ring structure is improved.

In some implementations, as shown in FIG. 2, the first port 103 and the second port 104 on the first antenna 10 are used for connection to a first antenna feeding end 41, the third port 202 on the second antenna 20 is used for connection to a second antenna feeding end 42, and a phase angle difference between an electrical signal transmitted through the first port 103 to the first radiator 101 and an electrical signal transmitted through the second port 104 to the second radiator 102 is 180 degrees.

In addition, the third port 202 is connected to a part of the third radiator 201 on the first symmetry axis A, and the first radiator 201 and the second radiator 202 are distributed on two opposite sides of the first symmetry axis A, so that electrical signals transmitted through the third port 202 to the third radiator 201 respectively flow to both ends of the third radiator 201, that is, flow to the second gap 32 through the third port 202 and to the third gap 33 through the third port 202.

It should be noted that in actual application, the third radiator 201 does not necessarily have an absolute symmetry structure on the first symmetry axis A, and that the third port 202 is connected to a part of the third radiator 201 on the first symmetry axis A may be understood as follows: A location at which the third port 202 is connected to the third radiator 201 may be near the first symmetry axis A, that is, the third port 202 is connected to an intermediate region of the third radiator 201, and the first symmetry axis A intersects the intermediate region. In some implementations, the intermediate region may be a part of the third radiator 201, and a vertical distance between any point in the intermediate region and the first symmetry axis A is less than or equal to a preset distance value (for example, 0.5 mm). In this case, the third port 202 may be connected to the third radiator 201 through the connection point in the intermediate region, where the connection point may be a pad, a connection interface, or the like.

In addition, that the first port 103 and the second port 104 on the first antenna 10 are used for connection to the first antenna feeding end 41 may be understood as follows: After a feeding signal output by the first antenna feeding end 41 is divided into two phase-inverted electrical signals with equal amplitudes, the signals are respectively transmitted to corresponding radiators through the first port 103 and the second port 104.

To enable the phase angle difference between the electrical signal transmitted through the first port 103 to the first radiator 101 and the electrical signal transmitted through the second port 104 to the second radiator 102 to be 180 degrees (that is, phase-inverted), any one of the following manners may be used:

Manner 1

As shown in FIG. 2, the antenna structure further includes a power divider 40, a first phase-shift element 50, and a second phase-shift element 60.

The first port 103 is connected to a first end of the power divider 40 through the first phase-shift element 50, the second port 104 is connected to a second end of the power divider 40 through the second phase-shift element 60, and a third end of the power divider 40 is used for connection to a first antenna feed end 41.

A phase angle difference between an electrical signal processed by the first phase-shift element 50 and an electrical signal processed by the second phase-shift element 60 is 180 degrees.

The power divider 40 is configured to divide a feeding signal at the first antenna feeding end 41 into two sub-signals that have an equal amplitude and a same phase, where one sub-signal is transmitted to the first radiator 101 through the first phase-shift element 50 and the first port 103, and the other sub-signal is transmitted to the second radiator 102 through the second phase-shift element 60 and the second port 104.

In addition, in some implementations, the foregoing power divider may be a 3 dB power divider, to reduce a loss caused by the power divider to a feeding signal.

It should be noted that, in actual application, the foregoing power divider 40 may be replaced with a combiner or another radio frequency component or radio frequency circuit that has a power allocation function, and the feeding circuit of the first antenna is not specifically limited herein.

In addition, the first phase-shift element may be a first phase shifter 50, and the second phase-shift element may be a second phase shifter 60.

Further, a phase-shift angle of the first phase shifter 50 may be +90 degrees, and a phase-shift angle of the second phase shifter 60 may be −90 degrees. Alternatively, a phase-shift angle of the first phase shifter 50 may be −90 degrees, and a phase-shift angle of the second phase shifter 60 may be +90 degrees.

In some implementations, the phase-shift angle of the first phase shifter 50 and the phase-shift angle of the second phase shifter 60 may be other phase-shift angles other than +90 degrees and −90 degrees, provided that a difference between the phase-shift angle of the first phase shifter 50 and the phase-shift angle of the second phase shifter 60 is 180 degrees.

Manner 2

Figure 3:
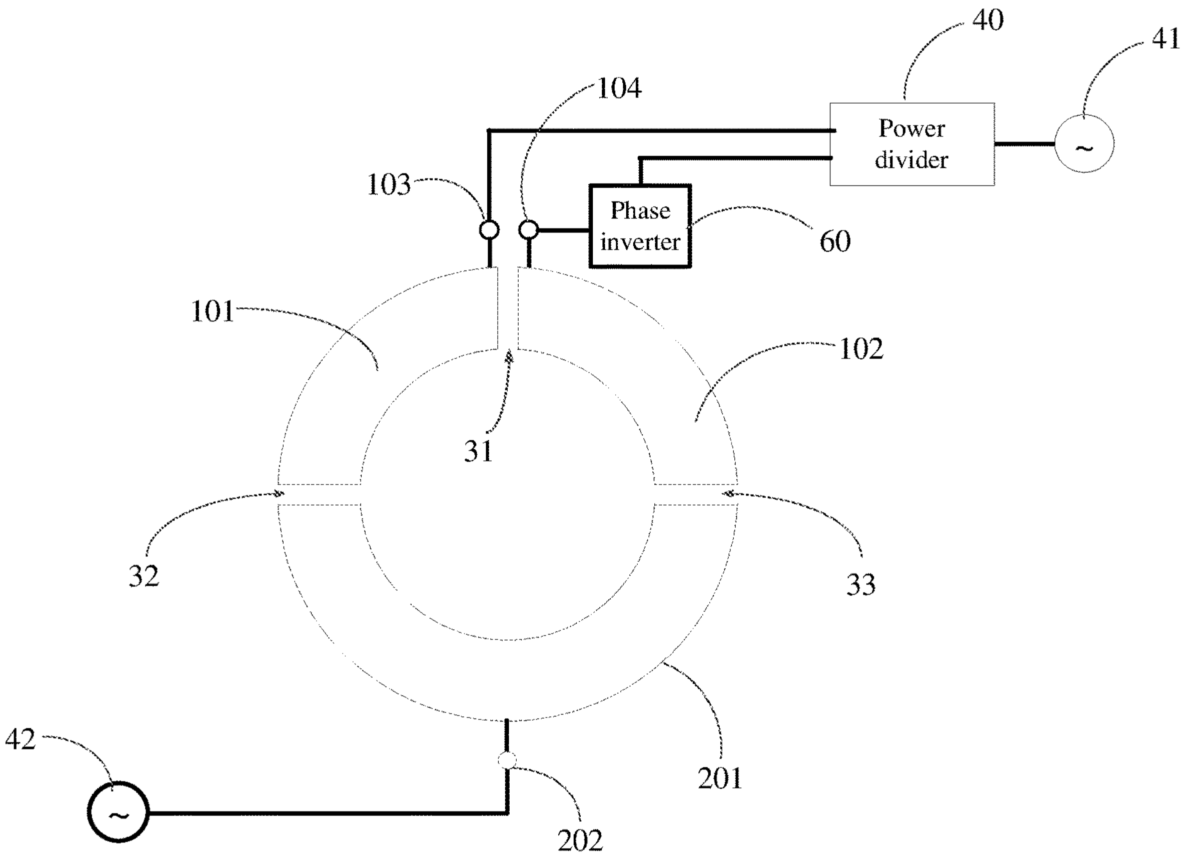
FIG. 3 is a second diagram of a feeding circuit in an antenna structure according to an embodiment of this application.

As shown in FIG. 3, the antenna structure further includes a power divider 40 and a phase inverter 70.

One of the first port 103 and the second port 104 (in FIG. 3, for example, the second port 104 is connected to the phase inverter 70) is electrically connected to a first end of the power divider 40 through the phase inverter 70, the other of the first port 103 and the second port 104 is electrically connected to a second end of the power divider 40, and a third end of the power divider 40 is used for connection to a first antenna feeding end 41.

In operation, the power divider 40 is configured to divide a feeding signal at the first antenna feeding end 41 into two sub-signals that have an equal amplitude and a same phase, where one sub-signal is transmitted to the first radiator 101 through the phase inverter 70 and the first port 103, and the other sub-signal is transmitted to the second radiator 102 through the second port 104, or one sub-signal is transmitted to the second radiator 102 through the second port 104 after being processed by the phase inverter 70, and the other sub-signal is transmitted to the first radiator 101 through the first port 103.

Manner 3

The antenna structure further includes a power divider, the first port is electrically connected to a first end of the power divider through a first signal transmission line, the second port is electrically connected to a second end of the power divider through a second signal transmission line, and a third end of the power divider is connected to a first antenna feeding end.

A length or impedance of the first signal transmission line is different from that of the second signal transmission line, so that a phase angle difference between an electrical signal transmitted through the first signal transmission line to the first radiator 101 and an electrical signal transmitted through the second signal transmission line to the second radiator 102 is 180 degrees.

It should be noted that, in manner 1 and manner 2, a length of a signal transmission line between the first port 103 and the first antenna feeding end is equal to that of a signal transmission line between the second port 104 and the first antenna feeding end, or a phase difference caused by a length difference between the two is 0.

Through the feeding circuit in any one of the foregoing manners, a current in the first radiator 101 and a current in the second radiator 102 may be in a polarization orthogonal current mode.

Figure 4:
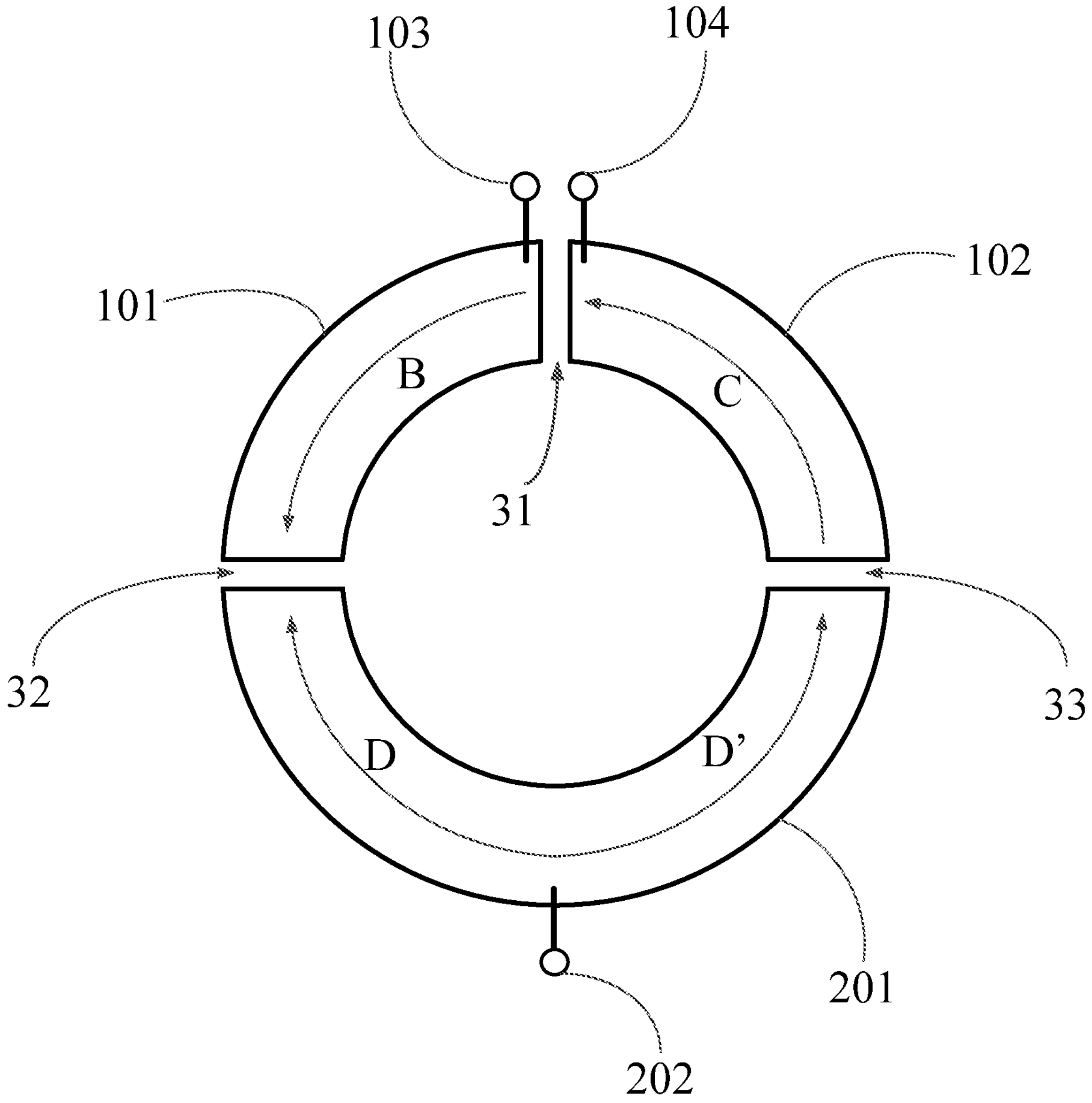
FIG. 4 is a schematic diagram of a current direction in an antenna structure according to an embodiment of this application.

For example, at a specified moment, a current flow direction in the ring structure may be shown in FIG. 4, where a current in the first radiator 101 is transmitted in a direction B, a current in the second radiator 102 is transmitted in a direction C, and a current in the third radiator 201 is divided into two parts, where a part of the current is transmitted in a direction D, and the other part of the current is transmitted in a direction D'.

It should be noted that the current flow direction in the ring structure may periodically change according to a radiation frequency, which is not limited to the current flow direction shown in FIG. 4.

Figure 5:
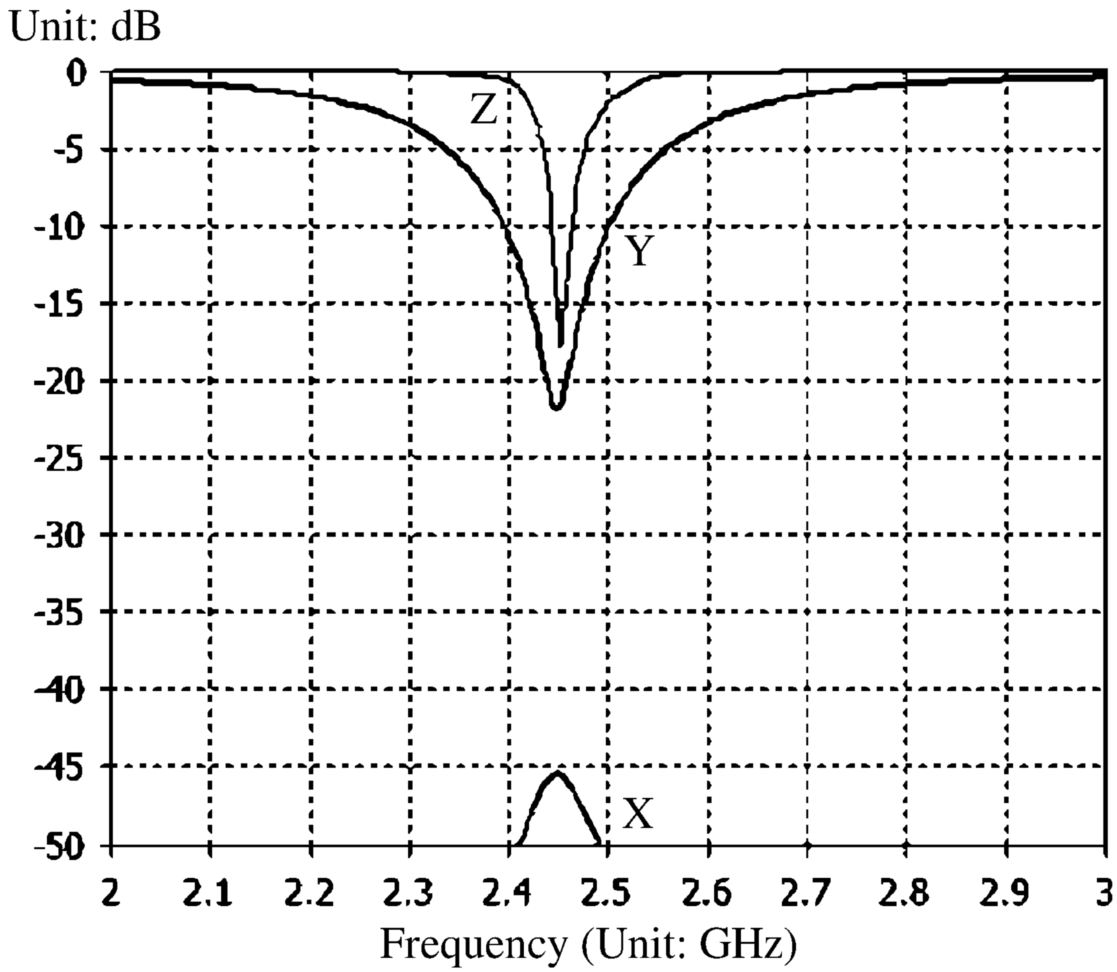
FIG. 5 is a schematic diagram of isolation of an antenna structure according to an embodiment of this application.

Feeding excitation is implemented on the two polarization orthogonal current modes in a same ring structure, so that isolation between the first antenna and the second antenna is increased. For example, as shown in a line X in the embodiment shown in FIG. 5, the line X represents a transmission coefficient between the first antenna (e.g., the first port 103 and the second port 104) and the second antenna (e.g., the third port 202), and a smaller transmission coefficient indicates greater isolation. As shown in FIG. 5, the transmission coefficient between the first antenna and the second antenna may be −45 dB, and is smaller than a transmission coefficient in the related art, which is generally −20 dB or −30 dB, so that isolation between the first antenna and the second antenna is increased in this embodiment of this application, thereby effectively reducing interference between the first antenna and the second antenna and improving radio frequency performance of the first antenna and the second antenna.

In addition, a line Y shown in FIG. 5 represents a reflection coefficient of the first antenna, and a line Z represents a reflection coefficient of the second antenna.

In this embodiment of this application, an orthogonal current mode can be implemented in the ring structure, and feed excitation is implemented on the two polarization orthogonal current modes in the ring structure, to increase isolation between a port of the first antenna and a port of the second antenna, so that the radiators of the first antenna and the second antenna can be disposed in a same ring structure. This avoids separately disposing radiators for the first antenna and the second antenna at different locations, and reduces an occupation space of the first antenna and the second antenna, thereby reducing a space for mounting antennas on the electronic device, and reducing a volume of the electronic device.

Figure 6:
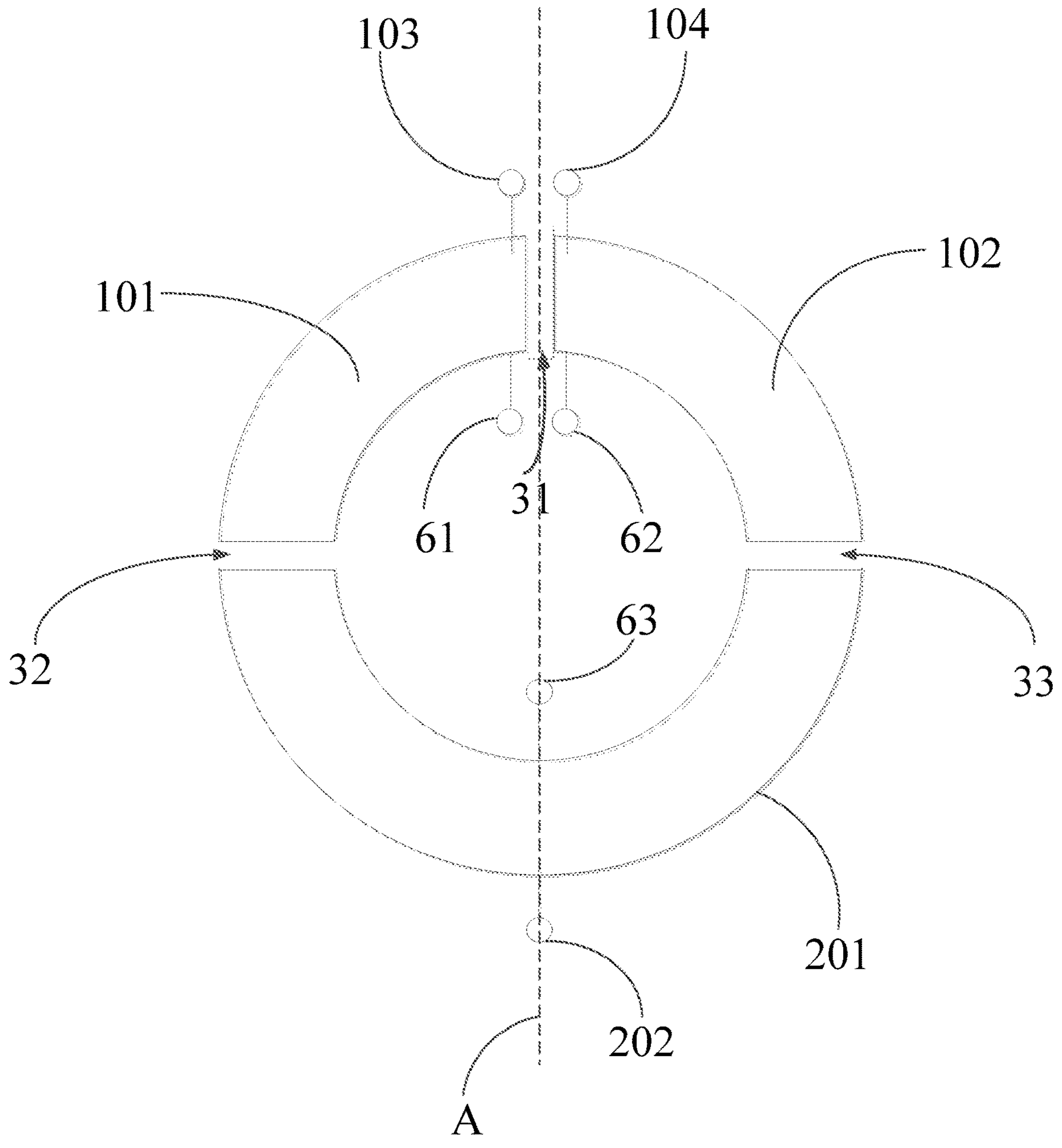
FIG. 6 is a schematic diagram of another antenna structure according to an embodiment of this application.
Figure 7:
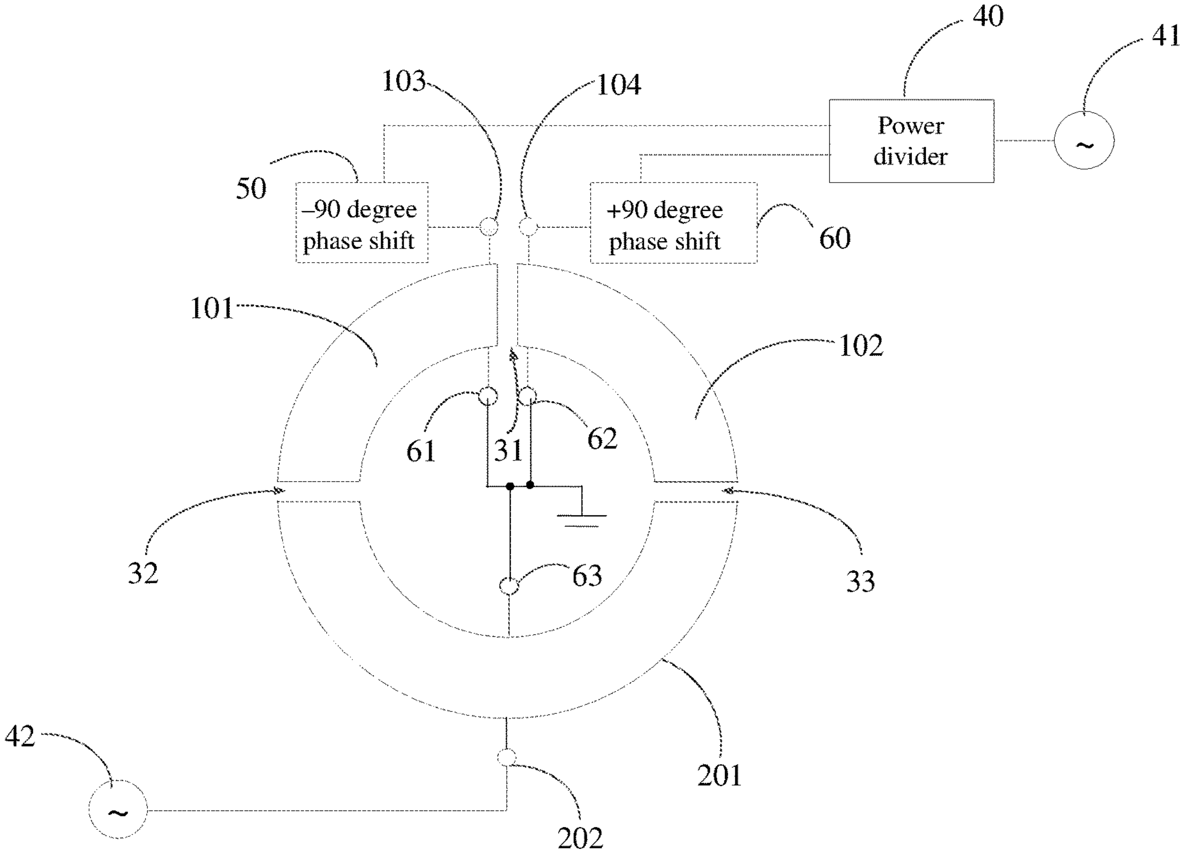
FIG. 7 is a diagram of a feeding circuit in another antenna structure according to an embodiment of this application.

Referring to FIG. 6 and FIG. 7, FIG. 6 is a schematic diagram of another antenna structure according to an embodiment of this application, and FIG. 7 is a schematic diagram of a feeding circuit in another antenna structure according to an embodiment of this application. The ring structure and the feeding circuit in this implementation are the same as the ring structure and the feeding circuit in FIG. 1 and FIG. 2 respectively, and details are not described herein again. A difference lies in that the antenna structure shown in FIG. 6 and FIG. 7 further includes a fourth port 61, a fifth port 62, and a sixth port 63.

The first port 103 and the fourth port 61 are connected to a first end of the first radiator 101, the second port 104 and the fifth port 62 are connected to a first end of the second radiator 102, and the third port 202 and the sixth port 63 are connected to a part of the third radiator 201 on the first symmetry axis A.

In an implementation, the first port 103, the second port 104, and the third port 202 are located on an outer side of the ring structure, and the fourth port 61, the fifth port 62, and the sixth port 63 are located on an inner side of the ring structure.

The fourth port 61, the fifth port 62, and the sixth port 63 are grounded, and the first port 103 and the second port 104 are used for connection to a first antenna feeding end 41, the third port 202 is used for connection to a second antenna feeding end 42, or the first port 103, the second port 104, and the third port 202 are grounded, the fourth port 61 and the fifth port 62 are used for connection to a first antenna feeding end 41, and the sixth port 63 is used for connection to a second antenna feeding end 42.

In some implementations, being grounded may be further understood as another equivalent grounding state in terms of a resonance frequency of the antenna structure. The equivalent grounding state has a similar meaning to the equivalent open circuit state in the embodiment shown in FIG. 1 and FIG. 2. Details are not described herein again.

In addition, in another implementation, the first port 103, the second port 104, and the third port 202 may be located on an inner side of the ring structure, and the fourth port 61, the fifth port 62, and the sixth port 63 may be located on an outer side of the ring structure.

In the embodiment shown in FIG. 7, for example, the fourth port 61, the fifth port 62, and the sixth port 63 are grounded, and the first port 103 and the second port 104 are used for connection to a first antenna feeding end 41, and the third port 202 is used for connection to a second antenna feeding end 42. In this case, a same manner as the antenna structure shown in FIG. 2 may be used to implement a 180-degree phase angle difference between electrical signals of the first port 103 and the second port 104. Details are not described herein again.

Figure 8:
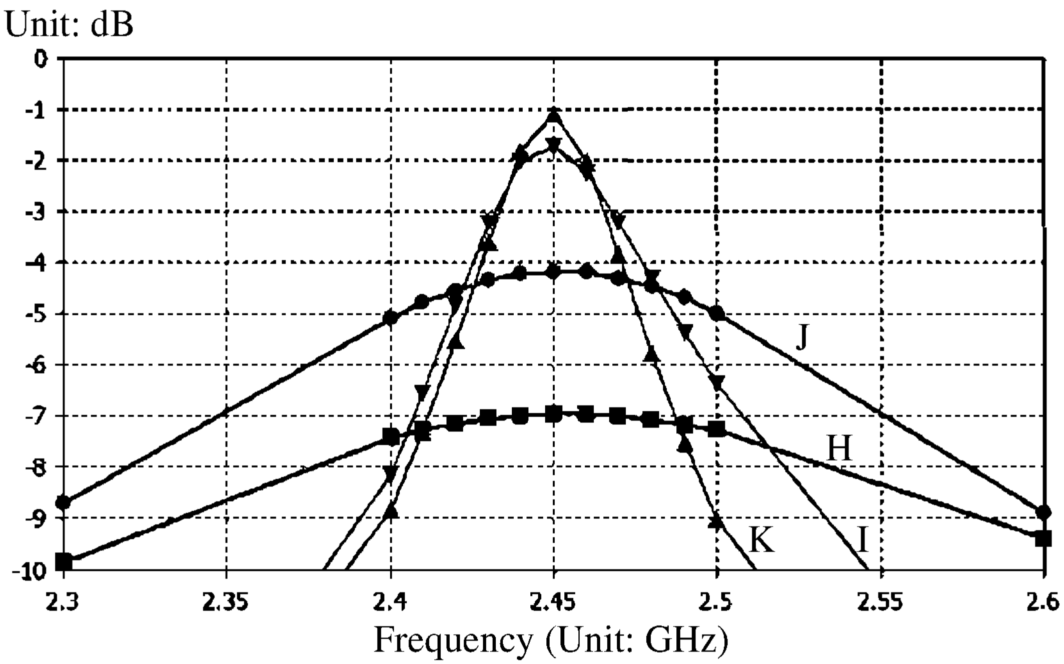
FIG. 8 is a schematic diagram of radiation efficiency of another antenna structure according to an embodiment of this application.

According to the antenna structure provided in this embodiment of this application, in addition to the same beneficial effect as the antenna structure shown in FIG. 1, antenna matching can be implemented by adding a short-circuit grounded port, thus improving antenna performance. For example, FIG. 8 is a line graph of a ratio of an input power to a radiation power, where a curve H is a ratio of an input power of the first antenna 10 in the antenna structure shown in FIG. 1 to a radiation power, a curve I is a ratio of an input power of the second antenna 20 in the antenna structure shown in FIG. 1 to a radiation power, a curve J is a ratio of an input power of the first antenna 10 in the antenna structure shown in FIG. 6 to a radiation power, and a curve K is a ratio of an input power of the second antenna 20 in the antenna structure shown in FIG. 6 to a radiation power.

A greater ratio of the input power to the radiation power indicates better performance of the antenna. It can be learned from FIG. 8 that performance of the first antenna 10 and performance of the second antenna 20 are improved after the short-circuit grounded port is added.

Figure 9:
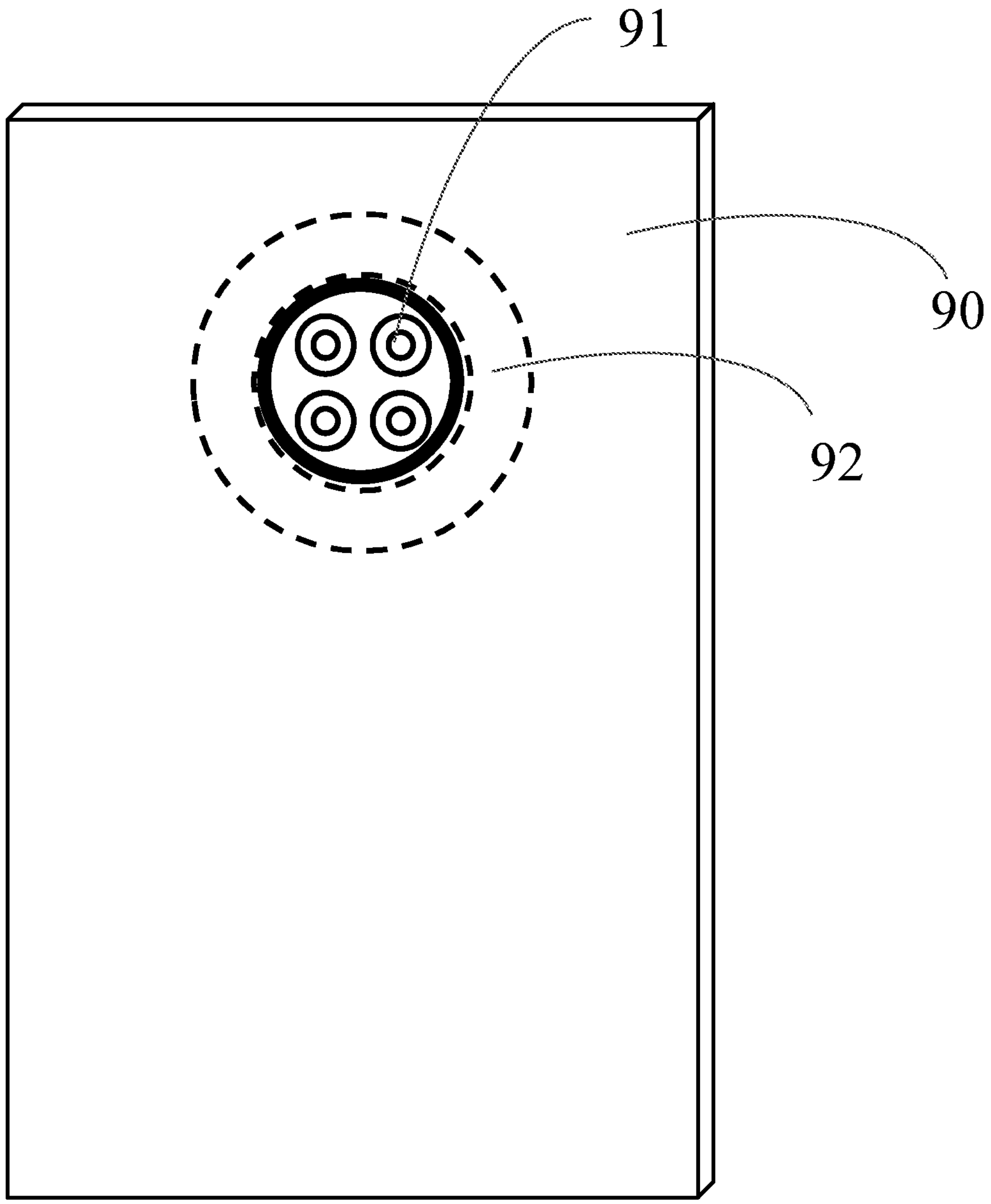
FIG. 9 is a schematic diagram of an electronic device according to an embodiment of this application.
Figure 10:
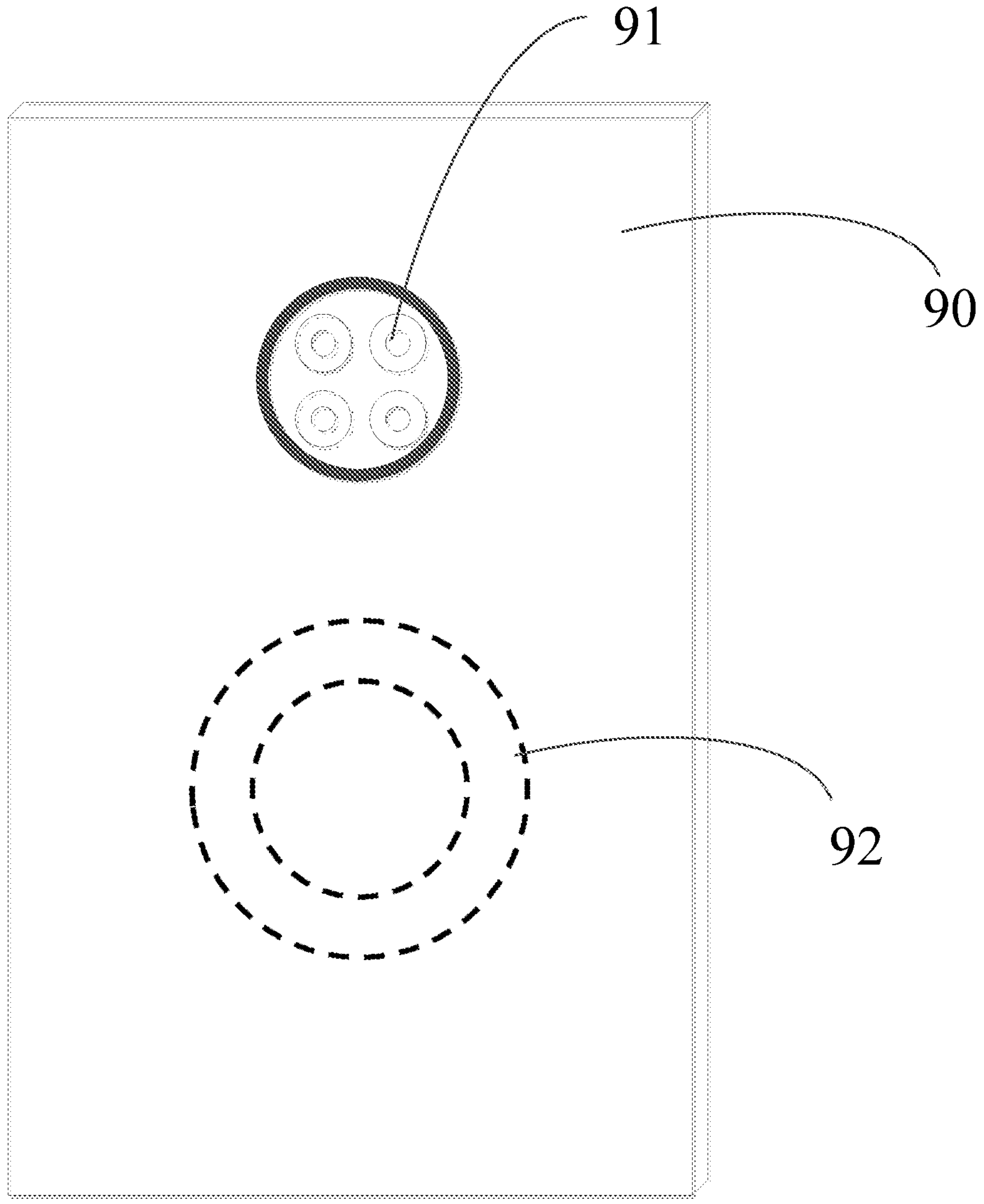
FIG. 10 is a schematic diagram of another electronic device according to an embodiment of this application.

Referring to FIG. 9 and FIG. 10, an embodiment of this application further provides an electronic device. The electronic device includes the antenna structure provided in any one of the foregoing embodiments.

The antenna structure may be exposed to a housing of the electronic device or may be disposed in a receiving cavity in the housing of the electronic device, so that radiators in the antenna structure are distributed to be insulated from other metal components on the electronic device.

For example, as shown in FIG. 9, the electronic device further includes a camera 91. A ring structure 92 (that is, the first radiator 101, the second radiator 102, and the third radiator 201 shown in FIG. 1) in the antenna structure is disposed around the camera 91. In this way, the antenna structure can be matched with a mounting region of the camera on the electronic device, so that a space surrounded by the ring structure can be utilized, thereby reducing a size of the electronic device.

In some implementations, the ring structure 92 can be further disposed anywhere in the electronic device. For example, as shown in FIG. 10, in a case that the electronic device includes a non-metal housing, the ring structure 92 is attached to an inner side of a housing 90 of the electronic device.

Figure 11:
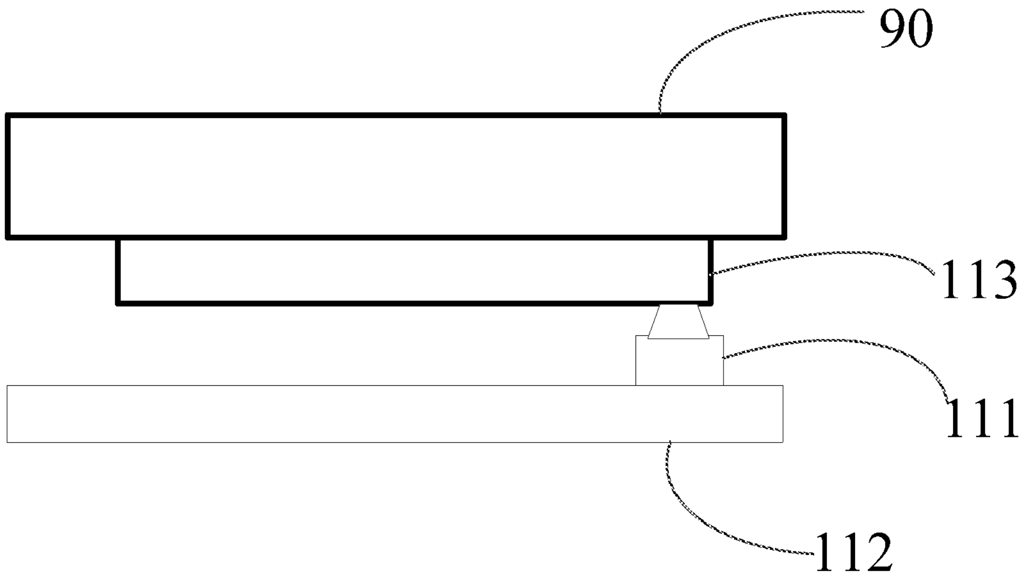
FIG. 11 is a first schematic structural diagram of an antenna structure and a non-metal housing in an electronic device according to an embodiment of this application.

Further, as shown in FIG. 11, a port 111 of each antenna may be connected between a circuit board 112 in the electronic device and a corresponding radiator 113 (for example, the first port 103 corresponds to the first radiator 101), and a connection point between the port 111 and the corresponding radiator 113 is located on a side that is of the radiator 113 and that is opposite to the housing 90.

In this way, since the ring structure is a sheet structure located in a same plane, so that the antenna structure can be mounted in an electronic device with a small thickness such as a mobile phone.

Figure 12:
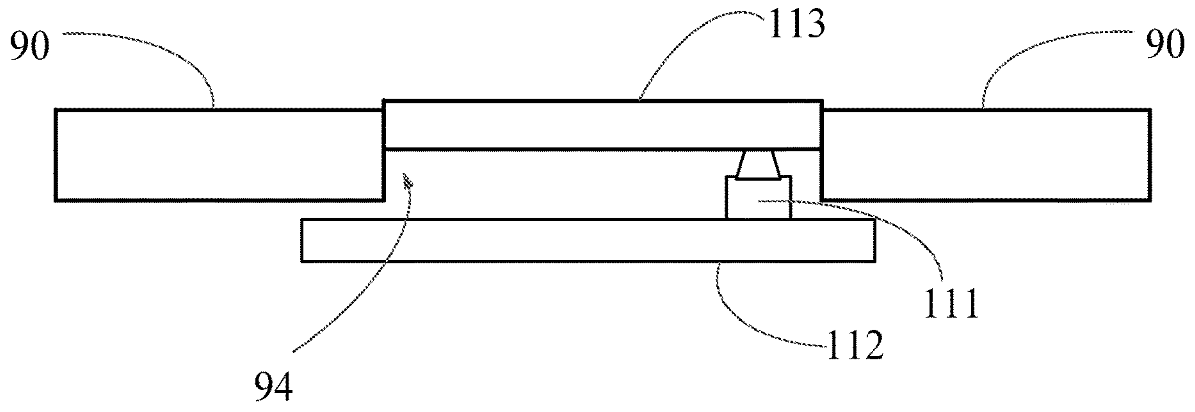
FIG. 12 is a second schematic structural diagram of an antenna structure and a non-metal housing in an electronic device according to an embodiment of this application.

It should be noted that in some implementations, as shown in FIG. 12, a through hole 94 may be further disposed on the housing 90 of the electronic device, so that the radiator 113 is exposed to a surface of the electronic device through the through hole 94. Similarly, the port 111 of each antenna may be connected between the circuit board 112 in the electronic device and the corresponding radiator 113 (for example, the first port 103 corresponds to the first radiator 101), and a connection point between the port 111 and the corresponding radiator 113 is located on a side that is of the radiator 113 and that faces the electronic device.

In particular, in a case that the electronic device has a metal housing, a through hole is disposed on the metal housing, so that the ring structure in the antenna structure is disposed in the through hole, and the through hole is exposed to the metal housing, thereby implementing insulation between the antenna structure and the metal housing.

In some implementations, to implement insulation between the antenna structure and the metal housing, an insulating material may be further filled between the radiator of the antenna structure and the metal housing.

In this implementation, the through hole is disposed on the electronic device, so that the ring structure is exposed outside the housing of the electronic device through the through hole, thereby further reducing a thickness of the electronic device.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. An antenna structure, comprising:

a first antenna; and a second antenna, wherein the first antenna comprises a first radiator, a second radiator, a first port, and a second port, and the second antenna comprises a third radiator and a third port, wherein the first radiator, the second radiator, and the third radiator jointly constitute a ring structure, and there is a first gap between the first radiator and the second radiator, a second gap between the first radiator and the third radiator, and a third gap between the second radiator and the third radiator, and wherein the first port is connected to a first end that is of the first radiator and that is near the first gap, the second port is connected to a first end that is of the second radiator and that is near the first gap, a feeding signal transmitted through the first port and a feeding signal transmitted through the second port are phase-inverted, the third port is connected to an intermediate region of the third radiator, the first radiator and the second radiator are respectively located on two opposite sides of a first symmetry axis, and the first symmetry axis intersects the intermediate region.

2. The antenna structure according to claim 1, wherein the antenna structure further comprises a power divider, a first phase-shift element, and a second phase-shift element, wherein the first port is connected to a first end of the power divider through the first phase-shift element, the second port is connected to a second end of the power divider through the second phase-shift element, and a third end of the power divider is used for connection to a first antenna feeding end, and wherein a phase angle difference between an electrical signal processed by the first phase-shift element and an electrical signal processed by the second phase-shift element is 180 degrees.

3. The antenna structure according to claim 1, wherein the antenna structure further comprises a power divider and a phase inverter, wherein one of the first port and the second port is electrically connected to a first end of the power divider through the phase inverter, the other of the first port and the second port is electrically connected to a second end of the power divider, and a third end of the power divider is used for connection to a first antenna feeding end.

4. The antenna structure according to claim 1, wherein the antenna structure further comprises a fourth port, a fifth port, and a sixth port, wherein the first port and the fourth port are connected to a first end of the first radiator, the second port and the fifth port are connected to a first end of the second radiator, and the third port and the sixth port are connected to a part of the third radiator on the first symmetry axis, wherein the first port, the second port, and the third port are respectively on one of an outer side and an inner side of the ring structure, and the fourth port, the fifth port, and the sixth port are respectively on the other of the outer side and the inner side of the ring structure, and wherein the fourth port, the fifth port, and the sixth port are grounded, the first port and the second port are used for connection to a first antenna feeding end, and the third port is used for connection to a second antenna feeding end; or the first port, the second port, and the third port are grounded, the fourth port and the fifth port are used for connection to a first antenna feeding end, and the sixth port is used for connection to a second antenna feeding end.

5. The antenna structure according to claim 1, wherein the first radiator and the second radiator are symmetrically distributed along the first symmetry axis.

6. An electronic device, comprising the antenna structure according to claim 1.

7. The electronic device according to claim 6, wherein the electronic device further comprises a camera, and a ring structure in the antenna structure is disposed around the camera.

8. The electronic device according to claim 6, wherein the electronic device has a metal housing, a through hole is disposed on the metal housing, and a ring structure in the antenna structure is disposed in the through hole and is insulated from the metal housing.

* * * * *